Nov. 15, 1938.   R. HIRSCHSON   2,136,505
MACHINE FOR AUTOMATIC FORMING AND DELIVERY OF ICE CREAM
Filed May 20, 1936    4 Sheets-Sheet 1

Inventor:
R. Hirschson

By: Glascock Downing & Seebold
Attys.

Nov. 15, 1938.       R. HIRSCHSON       2,136,505
MACHINE FOR AUTOMATIC FORMING AND DELIVERY OF ICE CREAM
Filed May 20, 1936       4 Sheets-Sheet 2

Inventor:
R. Hirschson

By Glascock Downing Seebold
Attys.

Nov. 15, 1938.  R. HIRSCHSON  2,136,505
MACHINE FOR AUTOMATIC FORMING AND DELIVERY OF ICE CREAM
Filed May 20, 1936  4 Sheets-Sheet 3
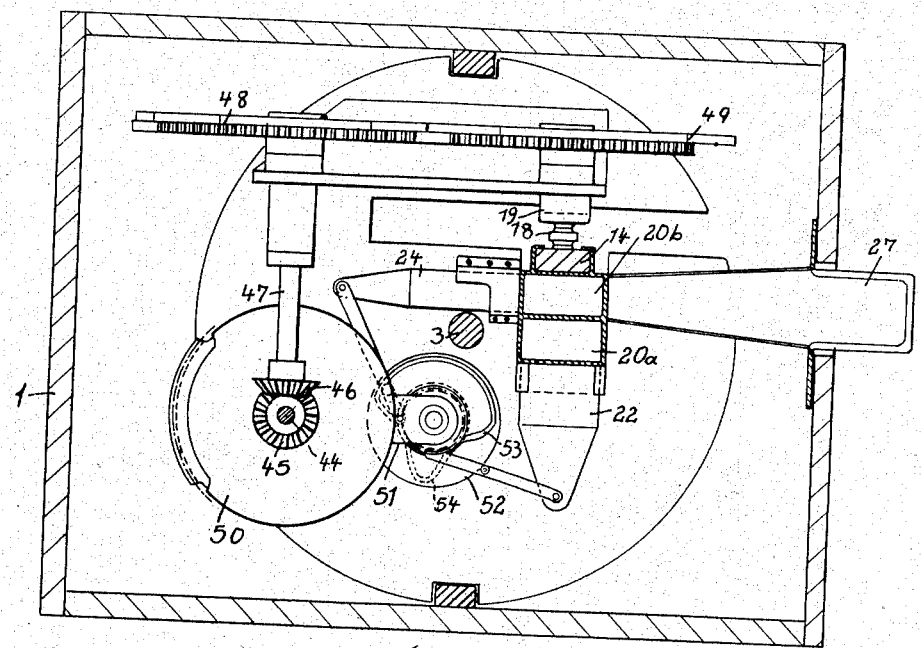
Fig.3
Fig.7
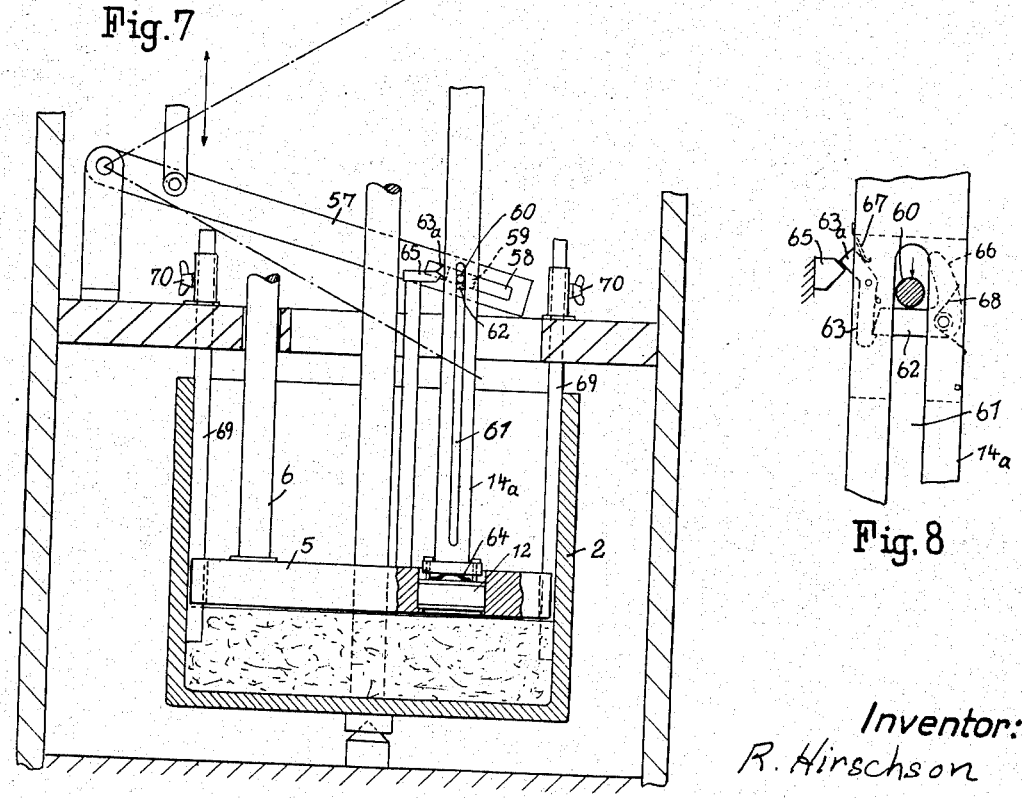
Fig.8
Inventor:
R. Hirschson
By: Glascock Downing & Seebold
Attys.

Nov. 15, 1938.  R. HIRSCHSON  2,136,505

MACHINE FOR AUTOMATIC FORMING AND DELIVERY OF ICE CREAM

Filed May 20, 1936  4 Sheets-Sheet 4

Inventor:
R. Hirschson

By: Glascock Downing & Seebold
Attys.

Patented Nov. 15, 1938

2,136,505

UNITED STATES PATENT OFFICE 2,136,505

MACHINE FOR AUTOMATIC FORMING AND DELIVERY OF ICE CREAM

Richard Hirschson, Berlin-Pankow, Germany

Application May 20, 1936, Serial No. 80,880
In Germany May 22, 1935

11 Claims. (Cl. 107—1)

The invention relates to a machine for the automatic forming and delivery of ice-cream, with which the mass of ice-cream intended for shaping is taken off by means of an implement moving in relation to the surface of the body of ice-cream.

The purpose of the invention is to obtain an easy and good taking-off of the ice-cream and to deliver the latter in the shape, for example, of clean cut wafer sandwiches.

In accordance with the invention, for the purpose of taking-off the mass of ice-cream, a knife is provided inclined to the surface of the ice-cream and a chamber is provided above the knife for the purpose of receiving the ice cream which has been taken-off, the ice cream which has been taken-off being conveyed into the chamber by the knife, and being conveyed out of it by other members. With this arrangement, the knife slices off the mass of ice-cream with relatively little expenditure of power and conveys it into the chamber above the knife, whereby a continuous compact slice is formed.

In the drawings are depicted by way of example several embodiments of the invention.

Figure 3 is a horizontal section on the line III—III of Figure 1.

Figure 7 is a vertical longitudinal section through the lower part of a modified device, Figure 8 being a detail view thereof.

Figure 1:
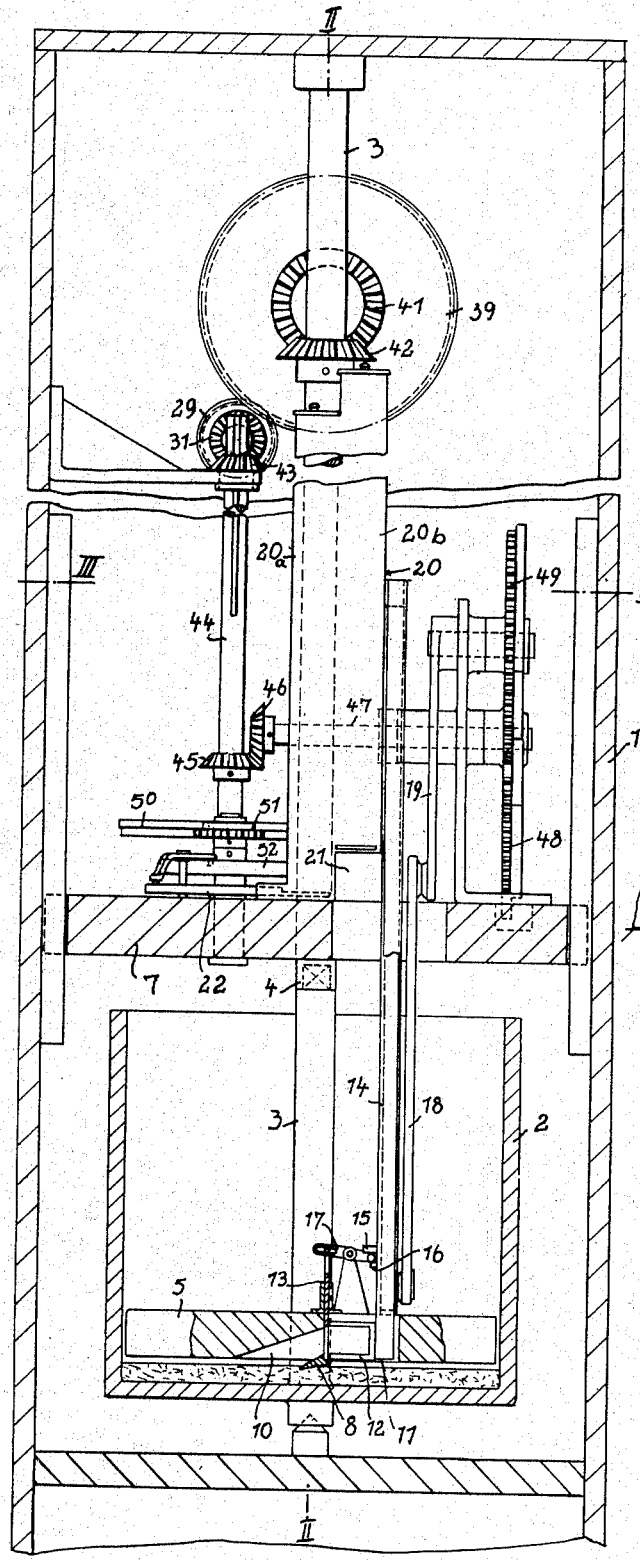
Figure 1 is a vertical longitudinal section through one form of construction of the device.

Referring to Figures 1 to 6, the cylindrical ice-cream container or pot 2 is mounted rotatably in a casing 1. This container can be driven by the divided shaft 3, and in order to connect the two parts of the shaft 3 together, the lower part is provided with a square member which engages in a corresponding opening in the upper part of the shaft 3. A vertically displaceable circular plate 5 is arranged in the container 2 and is connected by means of pillars 6 (Figure 2) with an upper base plate 7. The plate 5 rests, therefore, on the mass of ice-cream which is in the container 2 with its own weight and with that of the device which is mounted on it.

Figure 6:
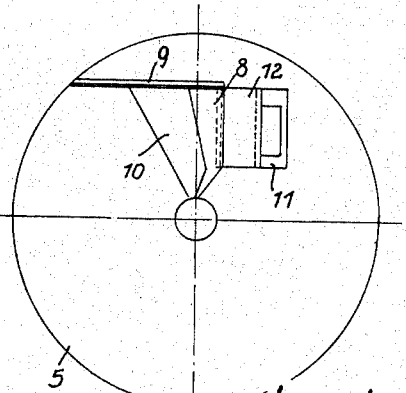
Figure 6 shows a plate arranged in the ice cream container and carrying the knife, seen from below.

A knife 8 is rigidly mounted on the plate 5 and, as may be seen specially from Figure 6, in consequence of its shape and of the provision of lugs 9, exerts its action over the whole radius of the container 2. Should narrower knives be employed, these could be given a reciprocating movement in the direction of their cutting edge, so that these narrower knives would act over the entire surface of the mass of ice cream. A cavity 10 is provided, above the knife, in the plate 5, which cavity opens laterally into an adjoining chamber 11, in which is situated the ice-cream mould 12. This mould is substantially of U-shape, and is, therefore, open in the direction of the cavity 10 and is also open at its two ends (front and back in Figure 1, left and right in Figure 2).

A sliding member 13 (Figure 1) is arranged between the cavity 10 and the mould 12 and is controlled by a lift-rod 14, to which is attached the mould 12. The sliding member is actuated by means of projections 15, 16 provided on the rod 14, the said projections acting upon a two-armed lever 17, in such a manner that during the latter part of the down-stroke of the rod 14, the lever is pivoted in a clockwise direction (Figure 1) and the sliding member 13 is thereby opened. During the first part of the up-stroke of the rod 14, on the other hand, the lever 17 is pivoted in an anti-clockwise direction and the sliding member is thereby closed. The purpose of the sliding member is to prevent passage of ice-cream from the cavity 10 into the chamber 11 when the mould is not in the cavity 11.

Figure 4:
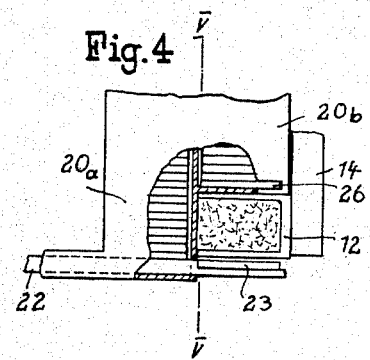
Figure 4 shows, on a larger scale, the lower part of the wafer magazines, in the manner of depiction according to Figure 1.
Figure 5:
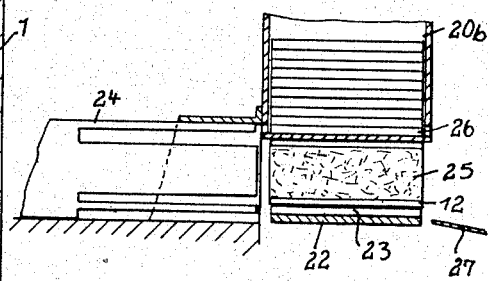
Figure 5 shows also on a larger scale a section through the lower part of a wafer magazine on the line V—V of Figure 4.

For the purpose of filling the mould, the container 2 is rotated in an anti-clockwise direction so that the knife 8 lifts a portion from the stock of ice cream and this is pushed into the cavity 10 and into the mould 12 which is situated behind it. The mould, after it is filled, is lfited by the rod 14, which is actuated by a connecting rod 18 and a crank arm 19, into the cavity 21 provided at the lower end of one of the wafer magazines 20. As soon as the mould has reached this position, the lifting device is stopped, by means of an automatic control device described hereinafter, and a wafer 23 is pushed out of the magazine 20a under the mould 12 by means of the sliding member 22 (Figure 4). Following this, the ice-cream block 25, the wafer 23 situated under the mould 12, and the lowest wafer 26 from the second wafer magazine 20b are pushed out by the ejector 24 (Figure 5), so that the whole reaches a delivery table 27.

Figure 2A:
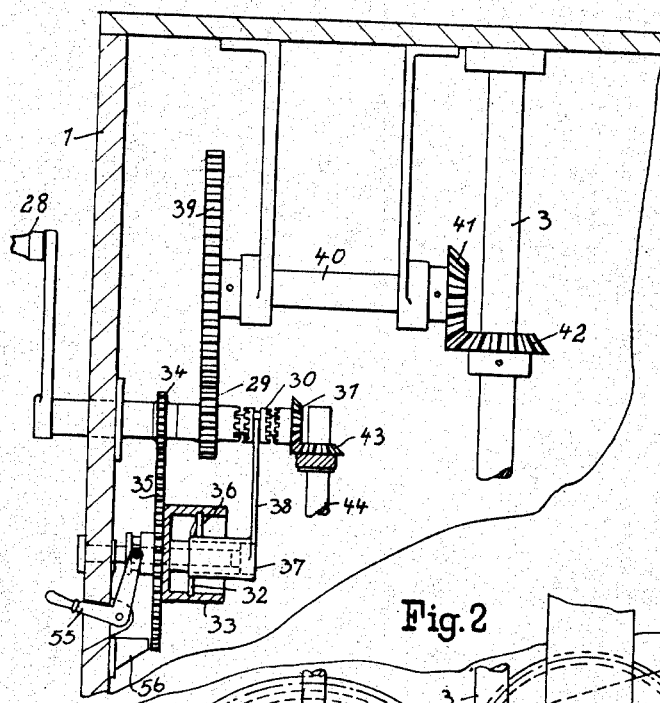
Figure 2 is a longitudinal section on the line II—II of Figure 1; the upper part of the device being broken away, Figure 2a being a similar view of the left side of the upper part.

The driving and control device which effects the movements just described is constituted as follows: the device is driven by means of a hand-crank 28 (Figure 2a). A toothed wheel 29 and a bevel wheel 31 are freely mounted on the crank-shaft and have dog-clutch teeth with which a clutch sleeve 30 can selectively engage, the sleeve being free to move axially on the shaft while being unable to rotate thereon.

The control of the clutch sleeve is effected by means of a bush 33, provided inside with a curved groove 32, which bush is driven by means of a toothed wheel 34 fixed on the crankshaft and the toothed wheel 35 rigidly connected with the bush 33.

A pin 36 fixed to a bush 37 engages with the curved groove 32, the bush 37 being axially displaceable upon a boss of the bush 33 and the boss being rotatable in the bush 37. The bush 37 is connected with the clutch sleeve 30 by means of the arm 38.

Shortly after the beginning of rotation of the hand-crank 28, the curved groove 32 displaces the bush 37 and thereby the clutch sleeve 30 towards the left, so that the toothed wheel 29 is clutched to the crankshaft. The chosen ratio of the gears 34, 35 and the form of the cam groove 32 causes the coupling sleeve 30, after four rotations of the crank, to be displaced to the right to disconnect the wheel 29 from the crank-shaft. While the wheel 29 is clutched to the crank-shaft, the rotation of the hand-crank 28 is transmitted to the pot 2 through the toothed wheel 39, the shaft 40, bevel wheels 41 and 42 and shaft 3, so that the knife 8 which rests upon the mass of ice-cream in the pot 2, comes into action.

Upon the completion of the fourth rotation of the hand-crank, the clutch sleeve 30 comes into engagement with the bevel wheel 31, so that the latter is clutched with the hand-crank shaft and drives the crank 19 and thereby the lifting mechanism for the mould 12, by way of the bevel wheel 43, the shaft 44 (Figure 2), bevel wheels 45, 46, shaft 47 (Figure 1) and maltese wheels 48 and 49. The maltese drive effects the due interruption of the drive as soon as the mould has entered the cavity 21 (Figure 1).

With further rotation of the crank 28, a cam disc 52 is put into rotation by means of a maltese wheel 50 (Figure 3) fixed to the lower end of the shaft 44 and a maltese wheel 51 working in conjunction with it. This cam disc 52 first moves the pusher 22 by means of the curved groove 53, so that the pusher pushes the lowermost wafer 23 (Figure 4) of the magazine 20a under the mould. The curved groove 54 then moves the ejector 24 to the right (Figures 3 and 5), so that the block of ice-cream is pushed out with a wafer at the top and the bottom of it; following upon this, the pusher 22 and the ejector 24 are simultaneously drawn back by their appertaining curved groove. In the meantime, the maltese wheel 48 has moved on so much that the maltese wheel 49 and therewith the crank 19 are again driven, so that the mould is again conducted down by the lifting mechanism. When this occurs, as mentioned above, the sliding member 13 opens on the last part of the downward movement.

Figure 2:
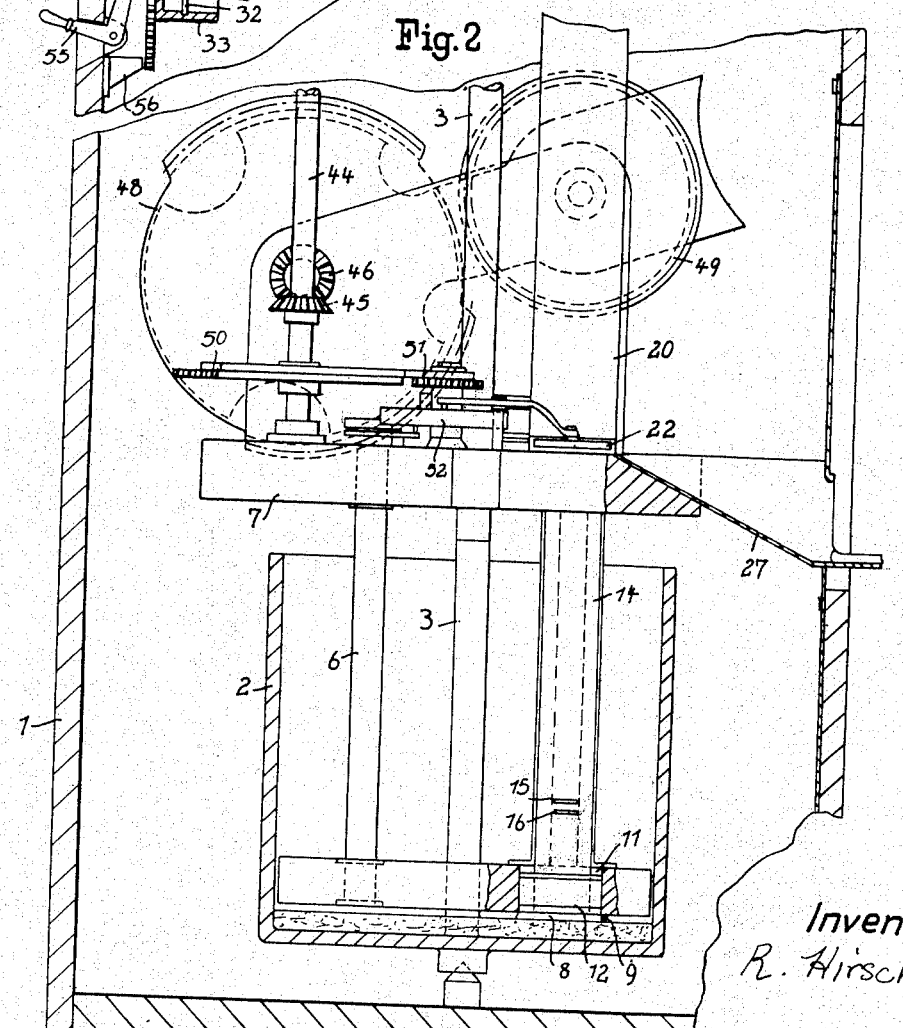

Following this, at the conclusion of the fifth revolution of the hand-crank 28, the clutch sleeve 30 is again moved to the left, into the initial position shown in Figure 2, by means of the curved groove 32, pin 36 and bush 37.

By means of the bell-crank lever 55 (Figure 2a), the bush 33 together with the toothed wheel 35 can be moved to the left by hand, so that the toothed wheel 35 is disengaged from the toothed wheel 34. The consequent movement of the coupling sleeve 30 clutches the wheel 29 to the crank-shaft, so that rotation of the hand-crank 28 can effect constant rotation of the pot 2 for the purpose of the manufacture of ice-cream, the control gear having been disabled so as to prevent interruption of the drive to the shaft 3. It naturally follows that with this, the base plate 7 (Figure 1), together with the plate 5, are lifted to such an extent that the plate 5 comes out of the pot 2.

A lug 56 (Figure 2a) is provided on the casing 1 and can engage in a deepened space between teeth of the wheel 35, when the wheel 35 is in its original angular position. The nose serves for locking the toothed wheel 35 when it is withdrawn by hand by means of the bell-crank lever 55, so that the toothed wheel, during disengagement, cannot leave its initial angular position, which is important for the correct timing of the control operations.

In the form of the invention shown in Figures 7 and 8, the plate 5 is able to sink and rise independently of the gear, so that, therefore, the gear and with it the ejection of the ice-cream product remain in one and the same position, independent of the position of the plate 5 in the pot 2. Owing to the alteration of the position of the plate 5 in relation to the gear, the stroke of the mould 12 is altered from its lower position to its higher position in the cavity 21 (Figure 1) of the wafer-magazine 20 which in Figure 7 is, for the sake of simplicity, not shown. This alteration of the stroke is rendered possible by means of the following device.

The lifting rod 14a of the mould 12 is moved upwards and downwards by means of the lever 57. This lever 57 is moved by a crank drive of the type, for example, of that described with relation to Figures 1 to 6. A sliding block 59 is displaceably mounted in a slot 58 of the lever 57, and carries a pin 60. This pin lies, during the upward movement of the lever 57 and, therefore, of the lifting rod 14a, at the upper limit of a slot 61 of the lifting rod. During the downward movement of the lever 57, the pin 60 engages with a catch 62 which is held in its path by means of a pawl 63.

When the mould 12 connected to the lifting rod 14a, in the present case with the interposition of a leaf-spring 64, reaches its lowest position, the nose 63a of the pawl 63 comes into the range of a stop 65. If the lifting rod 14a is moved further, which occurs with a compression of the spring 64, the pawl 63 is swung out by the stop 65, so that the catch 62, under the pressure of the pin 60 and under the action of its own weight, can move away downwards.

Whenever the mould 12 reaches its lowermost position before the lever 57 completes its stroke—by reason of the different positions of the plate 5—the lever 57 is automatically disengaged from the lifting rod 14a.

When the lever 57 is moved upwards again, the pin 60 at first moves idly in the slot 61, until it again meets the upper limit of the slot and consequently carries with it the lifting rod 14a. Shortly before this, the pin 60 encounters a downwardly directed lug 66 of the catch 62 and thus swings the catch 62 back into the position shown in Figure 8, in which it is held by means of the pawl 63 loaded by the spring 67.

The catch 62 is also under the action of a spring 68 which tends to turn this catch 62 in an anticlockwise direction so that it does not swing into the slot as long as it is free from the pawl.

Spatulas 69 pass through the plate 5 and can be adjusted as regards their height when the wing nuts 70 are released. These spatulas can be of any desired suitable shape and serve to stir up the mass, e. g. if owing to an increase of temperature of the pot 2, the outer portions of the mass attained a soft consistency.

The spatulas shown lie only on the outer wall, but they can of course be arranged nearer to the centre of the pot.

The guiding columns 6 can also take the form of spatulas if desired.

In the case of the device being constructed in the form of a coin-operated automatic machine, the coin can act upon a locking device which ordinarily prevents the rotation of the crank 28 which is freed by direct or indirect action of the coin.

The operating device described above would then be so constituted that the re-locking of the mechanism would be caused upon the last operation.

Should too great an increase of temperature in the machine cause melting of the stock of ice-cream, the machine can be provided with a locking device controlled by a thermostat to prevent operation of the machine. This locking device can act, for example, directly upon the crankshaft.

The provision of such a device is especially important in the case of the arrangement being constructed as a coin-operated automatic machine.

Figure 9:
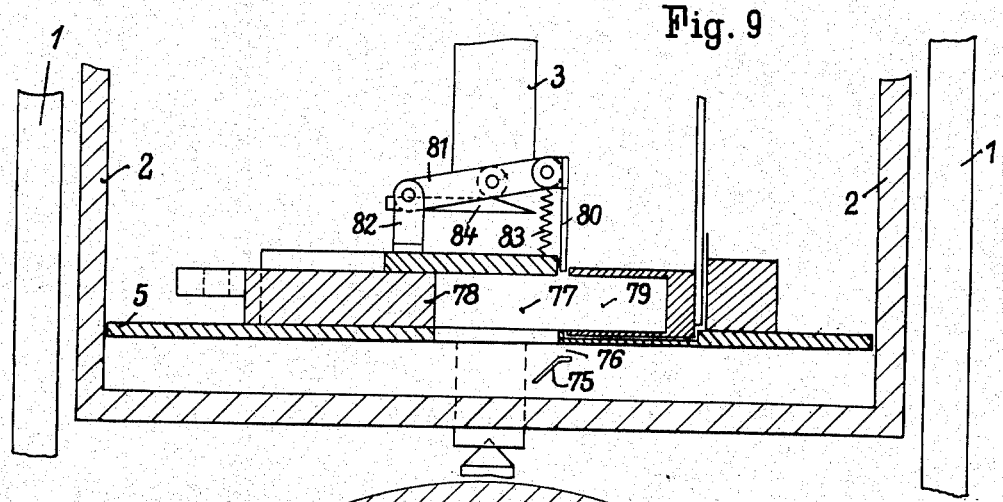
Figure 9 is a sectional elevation of the lower part of a modified form of ice cream container according to the invention.
Figure 10:
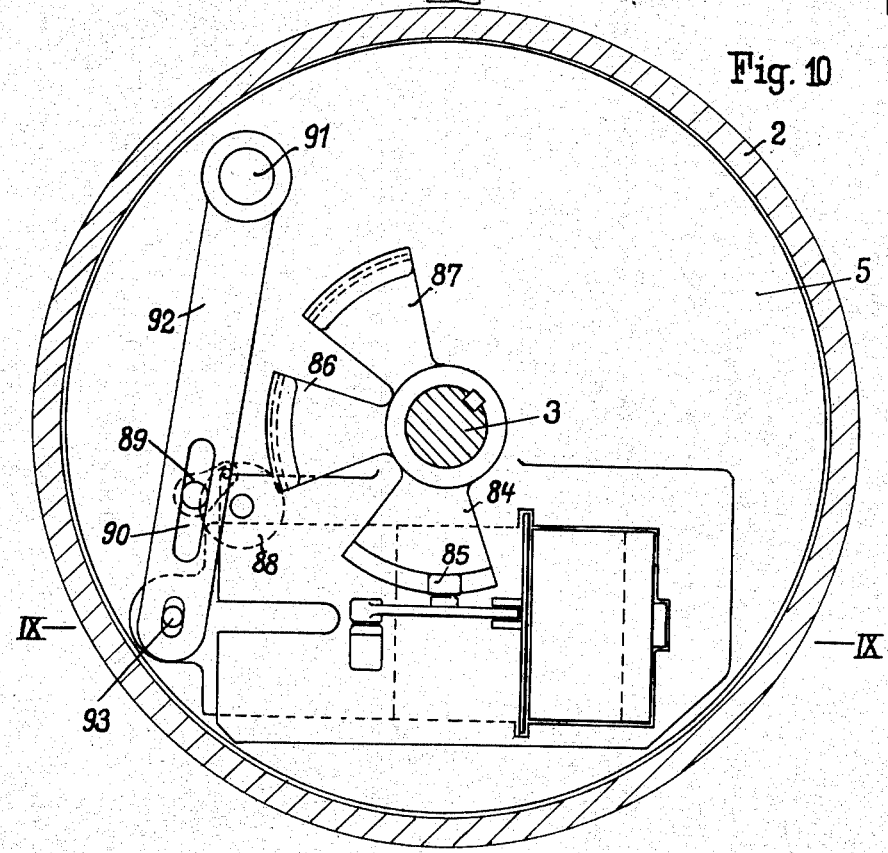
Figure 10 is a plan view corresponding to Figure 9.

In the modified form of the invention shown in Figures 9 and 10, a knife 75 is arranged on the under surface of the plate 5, which can be guided either in the manner depicted in Figure 1 or the manner depicted in Figure 7. The knife 75 is set at an inclination to the surface of the ice-cream, so that it lies with its upper edge at a distance from the lower surface of the plate. By means of the aperture 76 thus resulting, the excess amount of ice-cream which has been conveyed can escape, as soon as a chamber 77, provided above the knife, has been filled. From the chamber 77, the ice-cream can, by means of a piston 78, either be pressed into a chamber 79 arranged behind the chamber 77 or be conveyed further in the form of a strip which can be subdivided into portions by means of a cutting-off device. With the arrangement of the chamber 79 as a mould, it can be brought to the place of delivery in the manner of the mould designated 12 in the case of the form of construction according to Figure 1.

For the purpose of separating the chambers 77 and 79 from one another, a slide 80, which is linked to a lever 81, is employed. The lever 81 is pivotally attached to a bearing block 82. The bearing block 82 is arranged upon a super-structure of the plate 5. A spring 83 constantly urges the slide 80 into its lower position, in which the chambers 77 and 79 would be separated from one another. During the movement of the piston 78, the slide 80 is prevented from downward movement by a control segment 84. A roller 85 rotatably mounted on the lever 81 engages on the control segment 84, whereby the lever 81 and with it the slide 80 are held in the position shown in Figure 10 against the action of the spring 83. The control segment 84 cannot rotate about the shaft 3, but is displaceable with the plate 5 axially thereon. Toothed segments 86 and 87 are provided on the shaft 3, which toothed segments engage with a toothed wheel 88 which constitutes a crank disc. A crank 89 is attached to the toothed wheel 88 and engages in a slot 90 of a lever 92, pivoted on an axis 91. Accordingly the lever 92 is pivoted once backwards and forwards during one revolution of the segments 86 or 87. Since the lever is connected with the piston 78 by means of a pin slot connection 93, the piston 78 is likewise reciprocated and by means of this pushes the mass of ice-cream which is in the ante-chamber 77 into the chamber 79. The control segment 84 is so arranged in relation to the toothed segments 86 and 87 that the slide 80 is held in its inactive position shown in Figure 9 up to the end of the pushing forward movement of the piston 78. It is only after the termination of the conveying movement of the piston 78 that the slide 80 comes into the active position. The slide 80 can be in the form of a cutter and subdivide the strip.

I claim:

1. A machine for automatically moulding and delivering ice cream, comprising a container, means for rotating said container, a non-rotating plate adapted to rest on ice cream within said container and cover substantially the whole of said ice cream, means pressing said plate upon the ice cream, a knife mounted on said plate and inclined with respect to the bottom surface thereof, a collecting chamber within said plate between the center and periphery thereof, said plate having a passage leading from the bottom surface to said collecting chamber and said knife forming part of the lower wall of said passage.

2. The device as claimed in claim 1 in which there is a pushing member arranged on the plate for moving the ice cream separated by the knife into the chamber.

3. The device according to claim 1 wherein means passing through the plate is provided for stirring the ice cream.

4. A machine according to claim 1 wherein a mould chamber containing the mould is arranged behind the chamber serving for the collection of the ice cream which has been separated by the knife, and a piston for conveying the ice cream into said mould chamber.

5. A machine for automatically molding and delivering ice cream comprising a container, a plate adapted to rest on the ice cream within the container, a knife mounted on said plate and inclined with respect to the bottom surface thereof, said plate having a collecting chamber therein and a passage leading from the bottom surface to said collecting chamber, a mold in said chamber, means for causing relative rotation between said container and said plate whereby the ice cream is separated by said knife and moved into said mold, and means operably responsive to a predetermined relative movement between the plate and the container for moving the mold out of said container.

6. A machine for automatically molding and delivering ice cream comprising a container, a plate adapted to rest on the ice cream within the container, a knife mounted on said plate and inclined with respect to the bottom surface thereof, said plate having a collecting chamber therein and a passage leading from the bottom surface to said collecting chamber, a mold in said chamber, means for causing relative rotation between said container and said plate whereby the ice cream is separated by said knife and moved into said mold, a wafer magazine positioned above said container, means for moving the mold out of the container to a position adjacent the magazine, and means for moving at least one wafer to a position along the molded ice cream.

7. A machine for automatically molding and delivering ice cream comprising a container, a plate adapted to rest on the ice cream within the container, a knife mounted on said plate and inclined with respect to the bottom surface thereof, said plate having a collecting chamber therein and a passage leading from the bottom surface to said collecting chamber, a mold in said chamber, means for causing relative rotation between said container and said plate whereby the ice cream is separated by said knife and moved into said mold, a wafer magazine positioned above said container and having an aperture therein, means for raising the mold out of the container to a position adjacent said aperture, means for moving at least one wafer from said magazine to a position adjacent the molded ice cream, and means for adjusting the movement of the mold raising means so that the upper limits of the stroke will correspond to the position of the aperture in said magazine.

8. In a machine for automatically molding and delivering ice cream, a container, a plate adapted to rest on the ice cream within the container, a knife mounted on said plate and inclined with respect to the bottom surface thereof, said plate having a collecting chamber therein and a passage extending from the bottom surface thereof to the collecting chamber, a mold positioned within the chamber, means for causing relative rotational movement between said container and said plate whereby the ice cream separated by the knife is moved into said mold, means for moving the mold out of the chamber and a slidable member associated with said plate and movable in response to the initial movement of said last mentioned means to cut the ice cream in said passage and close the collecting chamber.

9. In a machine for automatically molding and delivering ice cream, a container, a plate adapted to rest on the ice cream within the container, a knife mounted on said plate and inclined with respect to the bottom surface thereof, said plate having a collecting chamber therein and a passage extending from the bottom surface thereof to the collecting chamber, a mold positioned within the chamber, means for causing relative rotational movement between said container and said plate whereby the ice cream separated by the knife is moved into said mold, said knife having a cavity between the lower edge thereof and the under surface of said plate through which cavity surplus ice cream after filling the collecting chamber may escape.

10. In a machine for automatically molding and delivering ice cream, a container, a plate adapted to rest on the ice cream within the container, a knife mounted on said plate and inclined with respect to the bottom surface thereof, said plate having a collecting chamber therein and a passage extending from the bottom surface thereof to the collecting chamber, a mold positioned within the chamber, means for causing relative rotational movement between said container and said plate whereby the ice cream separated by the knife is moved into said mold, two wafer magazines positioned above the container and having a delivery aperture therein, means for raising the mold to the level of said aperture, means for moving a wafer from each magazine to positions along the molded ice cream, and manually operable means for disconnecting the mold lifting means from the means for causing relative rotation between the plate and the container, and means associated with said manually operable means for assuring the proper timing when connection is again established.

11. In a machine for automatically molding and delivering ice cream, a container for receiving a supply of ice cream, means for rotating said container, a non-rotatable plate adapted to rest on the ice cream within said container and cover substantially the whole of the ice cream, means for causing relative movement between the plate and the container to press the plate on the ice cream, said plate being provided with a collecting chamber between the center and the periphery thereof and having an opening directed towards the ice cream to be received therein, a knife mounted adjacent the opening of the collecting chamber and inclined with respect to the plate, said knife detaching ice cream and leading the detached cream into the chamber upon rotation of the container.

RICHARD HIRSCHSON.